US 11,399,107 B2

(12) United States Patent
Sugawara

(10) Patent No.: US 11,399,107 B2
(45) Date of Patent: Jul. 26, 2022

(54) DISPLAY SYSTEM

(71) Applicant: FUJIFILM Business Innovation Corp., Tokyo (JP)

(72) Inventor: Masafumi Sugawara, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 415 days.

(21) Appl. No.: 16/354,190

(22) Filed: Mar. 15, 2019

(65) Prior Publication Data

US 2019/0387115 A1    Dec. 19, 2019

(30) Foreign Application Priority Data

Jun. 13, 2018   (JP) .............................. JP2018-112708

(51) Int. Cl.
*G06F 3/12* (2006.01)
*H04N 1/00* (2006.01)
(52) U.S. Cl.
CPC ............................... *H04N 1/00477* (2013.01)
(58) Field of Classification Search
None
See application file for complete search history.

(56) References Cited

U.S. PATENT DOCUMENTS

| | | | |
|---|---|---|---|
| 9,332,139 | B2 | 5/2016 | Hayashi |
| 10,423,367 | B1* | 9/2019 | Yamamoto .............. G06F 3/126 |
| 2005/0270566 | A1* | 12/2005 | Tanaka ..................... G06F 3/122 |
| | | | 358/1.15 |
| 2006/0279781 | A1* | 12/2006 | Kaneko ................. G06F 3/1204 |
| | | | 358/1.15 |
| 2010/0157371 | A1* | 6/2010 | Miyata ................. G06F 3/1275 |
| | | | 358/1.15 |
| 2011/0222090 | A1* | 9/2011 | Kadowaki .......... H04N 1/00244 |
| | | | 358/1.12 |
| 2014/0368873 | A1* | 12/2014 | Fukuda ................. G06F 3/1259 |
| | | | 358/1.15 |
| 2015/0103364 | A1* | 4/2015 | Abe .................... H04N 1/00411 |
| | | | 358/1.13 |

(Continued)

FOREIGN PATENT DOCUMENTS

| | | |
|---|---|---|
| JP | 2008299762 | 12/2008 |
| JP | 5101140 | 12/2012 |

(Continued)

OTHER PUBLICATIONS

"Office Action of Japan Counterpart Application", dated Apr. 12, 2022, with English translation thereof, pp. 1-11.

*Primary Examiner* — Dung D Tran
(74) *Attorney, Agent, or Firm* — JCIPRNET

(57) ABSTRACT

A display system includes a step-image display unit, a delivery-date-image display unit, and a resource-information display unit. The step-image display unit displays, for each print order, a step image in which multiple steps that each execute a process using a resource assigned in advance are arranged on a time axis, the step image illustrating a printed material generating step. The delivery-date-image display unit displays an image illustrating a delivery date of each print order at a corresponding position on the time axis. The resource-information display unit displays information on another resource that is different from the resource assigned in advance to each of the steps and that is usable in each of the steps.

11 Claims, 13 Drawing Sheets

(56) References Cited

U.S. PATENT DOCUMENTS

| | | | | |
|---|---|---|---|---|
| 2017/0052744 A1* | 2/2017 | Langeveld | ............ | G06F 3/1285 |
| 2017/0289370 A1* | 10/2017 | Abe | ....................... | G06F 3/1285 |
| 2019/0034130 A1* | 1/2019 | Tajima | .................. | G06F 3/1259 |

FOREIGN PATENT DOCUMENTS

| | | |
|---|---|---|
| JP | 2013084046 | 5/2013 |
| JP | 2013196286 | 9/2013 |
| JP | 2015001833 | 1/2015 |
| JP | 5812648 | 11/2015 |
| JP | 2016045539 | 4/2016 |
| JP | 2017091223 | 5/2017 |

* cited by examiner

DISPLAY SYSTEM

CROSS-REFERENCE TO RELATED APPLICATIONS

This application is based on and claims priority under 35 USC 119 from Japanese Patent Application No. 2018-112708 filed Jun. 13, 2018.

BACKGROUND

(i) Technical Field

The present disclosure relates to a display system.

(ii) Related Art

Japanese Unexamined Patent Application Publication No. 2016-45539 discloses an information processing device including a creation unit that creates a combination of a plurality of manufacturing steps of printing a first printed material and a second printed material by combining a manufacturing step of printing the first printed material and a manufacturing step of printing the second printed material.

In the case of adjusting the operation schedule for printing individually for each print order or for each printed material generating step, the range of adjusting the operation schedule tends to be limited to the range of each print order or of each printed material generating step.

SUMMARY

Aspects of non-limiting embodiments of the present disclosure relate to enabling adjustment of the operation schedule across a plurality of print orders or a plurality of printed material generating steps.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a display system including a step-image display unit, a delivery-date-image display unit, and a resource-information display unit. The step-image display unit displays, for each print order, a step image in which a plurality of steps that each execute a process using a resource assigned in advance are arranged on a time axis, the step image illustrating a printed material generating step. The delivery-date-image display unit displays an image illustrating a delivery date of each print order at a corresponding position on the time axis. The resource-information display unit displays information on another resource that is different from the resource assigned in advance to each of the steps and that is usable in each of the steps.

BRIEF DESCRIPTION OF THE DRAWINGS

Exemplary embodiments of the present disclosure will be described in detail based on the following figures, wherein:

FIG. 2 is a diagram illustrating functional units realized by a central processing unit (CPU) and the like;

DETAILED DESCRIPTION

Hereinafter, exemplary embodiments of the present disclosure will be described with reference to the accompanying drawings.

Figure 1:
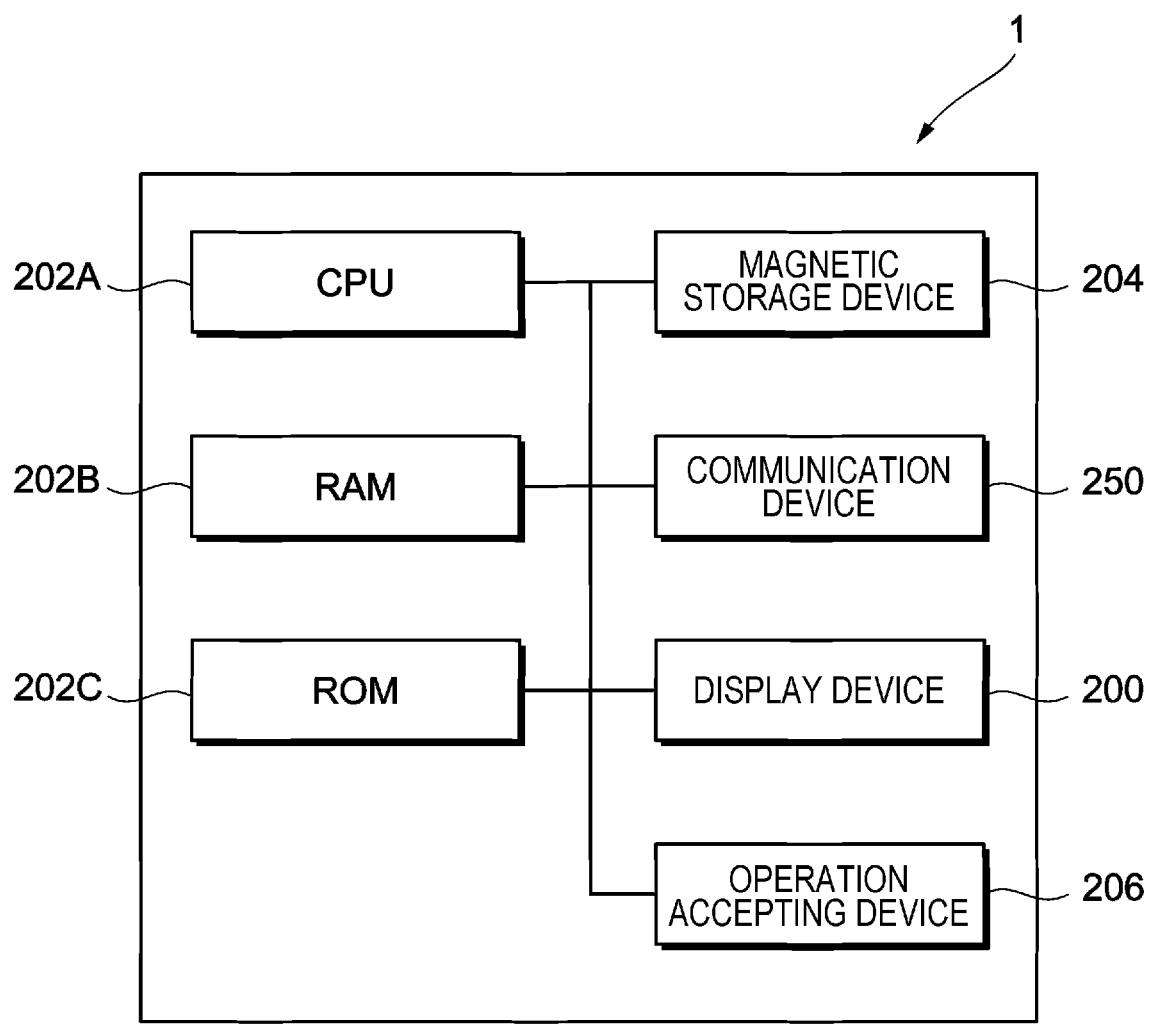
FIG. 1 is a diagram illustrating the configuration of a display system.

FIG. 1 is a diagram illustrating the configuration of a display system 1 according to a first exemplary embodiment.

As illustrated in FIG. 1, the display system 1 according to the present exemplary embodiment incudes a central processing unit (CPU) 202A, random-access memory (RAM) 202B, read-only memory (ROM) 202C, and a magnetic storage device 204. The display system 1 further includes a communication device (communication interface (I/F)) 250 for communicating with the outside.

The ROM 202C and the magnetic storage device 204 store programs executed by the CPU 202A. The CPU 202A reads programs stored in the ROM 202C and the magnetic storage device 204 and executes the programs using the RAM 202B as a work area.

Later-described functional units are realized by executing, by the CPU 202A, programs stored in the ROM 202C and the magnetic storage device 204.

Here, a program executed by the CPU 202A may be provided to the display system 1 by being stored in a computer readable recording medium, such as a magnetic recording medium (magnetic tape, magnetic disk, etc.), an optical recording medium (optical disk, etc.), a magneto-optical recording medium, or semiconductor memory. In addition, a program executed by the CPU 202A may be downloaded to the display system 1 using communication means such as the Internet.

The display system 1 further includes a display device 200 and an operation accepting device 206.

The display device 200 includes, for example, a touchscreen-type display and displays information. More specifically, the display device 200 receives display instructions from later-described various display functional units and displays information.

The operation accepting device 206 includes a mouse, a keyboard, and a touchscreen-type display, and accepts operations performed by an operator.

Figure 2:
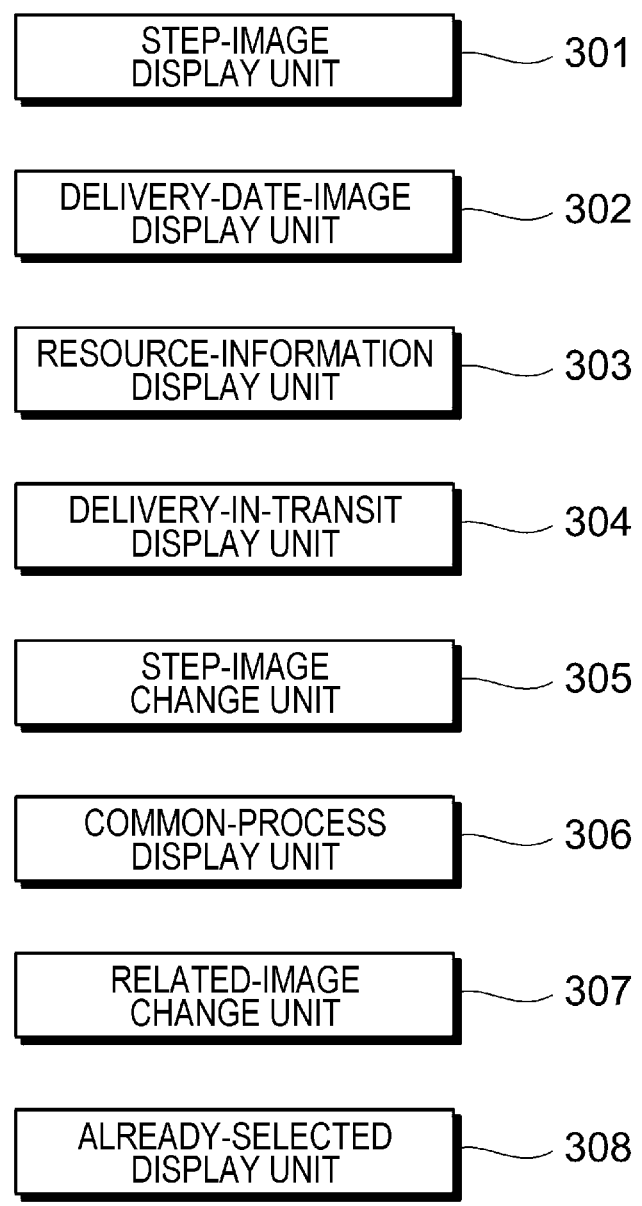

FIG. 2 is a diagram illustrating functional units realized by the CPU 202A and the like. The functional units illustrated in FIG. 2 are realized by executing, by the CPU 202A, programs stored in the ROM 202C and the magnetic storage device 204.

The display system 1 according to the present exemplary embodiment includes, as illustrated in FIG. 2, a step-image display unit 301, a delivery-date-image display unit 302, a resource-information display unit 303, a delivery-in-transit display unit 304, a step-image change unit 305, a common-process display unit 306, a related-image change unit 307, and an already-selected display unit 308.

The step-image display unit 301, which serves as an example of a step-image display unit, gives a display instruction to the display device 200 to display, for each print order, a step image illustrating a printed material generating step (details will be described later).

In each such step image, a plurality of steps (images representing steps) that each execute a process using resources that are assigned in advance are arranged on the time axis and are displayed.

The delivery-date-image display unit 302, which serves as an example of a delivery-date-image display unit, gives a display instruction to the display device 200 to display an image illustrating the delivery date of each print order at a corresponding position on the time axis on which the above-mentioned steps are arranged.

The resource-information display unit 303, which serves as an example of a resource-information display unit, gives a display instruction to the display device 200 to display information on other resources that are different from resources assigned in advance to each of the above-mentioned steps and that are usable in each of the steps.

The delivery-in-transit display unit 304, which is an example of a delivery-in-transit display unit, gives a display instruction to the display device 200 to perform display indicating that the delivery date of a print order will not be met.

More specifically, the delivery-in-transit display unit 304 performs display indicating that the delivery date will not be met in the case where an image illustrating the delivery date is positioned on a side of the end of the step image that faces the start point.

The step-image change unit 305, which serves as an example of a step-image change unit, changes a step image displayed on the display device 200 in the case where other resources displayed by the resource-information display unit 303 are selected.

In addition, the step-image change unit 305 changes a step image in the case where a later-described common process is selected.

The common-process display unit 306, which serves as an example of a common-process display unit, gives a display instruction to the display device 200 to display one or more common processes executed in both of a printed material generating step represented by a first step image and a printed material generating step represented by a second step image.

The related-image change unit 307, which is an example of a related-image change unit, changes a related image related to a step image in response to a change of the step image.

The already-selected display unit 308, which is an example of an already-selected display unit, performs display indicating that the above-described common process(es) has been selected.

Figure 3:
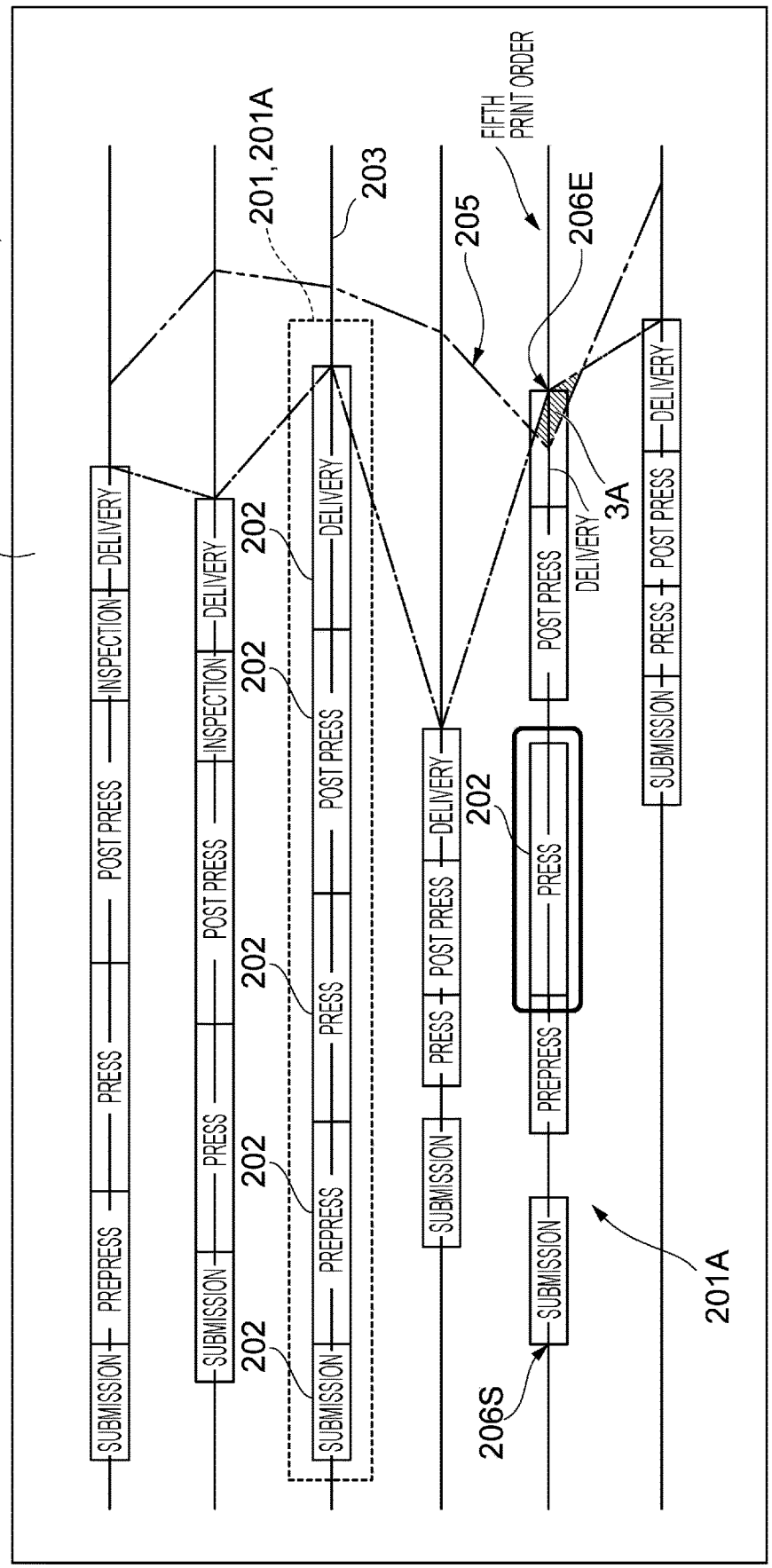
FIG. 3 is a diagram illustrating an example of a display screen of a display device.

FIG. 3 is a diagram illustrating an example of a display screen of the display device 200.

In the present exemplary embodiment, as illustrated in FIG. 3, the step-image display unit 301 displays a plurality of step images 201 illustrating printed material generating stepson the display device 200.

More specifically, the display screen illustrated in FIG. 3 is an overall display screen 200A, which illustrates the overview of printed material generating steps, and the overall display screen 200A displays a plurality of step images 201 corresponding to a plurality of print orders.

A plurality of step images 201, which are arranged vertically, are displayed on the overall display screen 200A. In addition, a plurality of steps 202 (images representing steps 202), which are arranged on a time axis 203, are displayed in each of the step images 201.

Resources for executing a process in each step 202 are assigned in advance to that step 202, and a process is executed in that step 202 using the pre-assigned resources.

The step images 201 are displayed for the individual print orders, and one step image 201 corresponds to one print order.

In the present exemplary embodiment, the case in which the time axis 203 is represented by a straight line, and the individual steps 202 are arranged on this straight line is illustrated by way of example. However, the time axis 203 need not necessarily be displayed; the phrase that "the steps 202 are arranged on the time axis 203" also includes a form in which the steps 202 are arranged on a not-illustrated time axis 203.

Here, a printed material generating step represented by each step image 201 includes steps 202, namely, submission, prepress, press, post press, inspection, and delivery.

Submission refers to a step at a preparation stage before a printing process starts. In submission, for example, data checking, operation planning, and instruction preparation are performed.

Prepress refers to a step of performing a process necessary for starting printing by a printer (not illustrated). In prepress, for example, data preparation, tool preparation, prepressing, and post-processing of prepress are performed.

Press refers to a step of performing a print process using a printer. In press, data preparation, device setup, print settings, pressing, and post-processing of press are performed.

Post press refers to a process of further processing a printed material generated by a printer, such as binding. In post process, preparation of an output product and/or part(s), device preparation, print settings, post pressing, and post-processing of post press are performed.

Inspection refers to a step of inspecting a printed material that has undergone post press. In inspection, inspection preparation and inspection are performed.

Delivery refers to a step of delivering a printed material that has been inspected. In delivery, delivery preparation, packing, and delivery are performed.

In addition, resources (human resources and/or material resources) for executing processes in the steps 202, namely, submission, prepress, press, post press, inspection, and delivery, are assigned in advance to these steps 202.

Specifically, an operator, a contractor, and web are assigned in advance to submission.

An operator, a contractor, and a tool(s) are assigned in advance to prepress.

An operator, a contractor, and a device(s) are assigned in advance to press.

An operator, a contractor, a nearline post-processing device, an inline post-processing device, and an offline post-processing device are assigned in advance to post press.

An operator, a contractor, a nearline inspection device, an inline inspection device, and an offline inspection device are assigned in advance to inspection.

An operator and a contractor are assigned in advance to delivery.

Here, each of the step images 201 on the overall display screen 200A illustrated in FIG. 3 is a step image 201 illustrating the overview of a printed material generating step. In the following description, each of the step images 201 illustrating the overview of a printed material generating step will be referred to as an overview step image 201A.

In addition, in the present exemplary embodiment, as will be described later, in response to selection, by the operator, of a step 202 that is part of and included in an overview step image 201A, a detailed step image 201B (described later) illustrating the details of the selected step 202 is displayed.

In the detailed step image 201B, a plurality of steps 202 (images representing the steps 202) are arranged on the time axis 203 and are displayed, and the detailed step image 201B is further displayed for each print order.

On the overall display screen 200A illustrated in FIG. 3, a plurality of overview step images 201A corresponding to a plurality of print orders are displayed in the form of a list. In other words, a plurality of overview step images 201A are displayed on one overall display screen 200A.

Accordingly, it becomes easier to review and/or reschedule the steps in the present exemplary embodiment.

Here, as a comparative example, in the case of individually managing each print order, it becomes difficult to perform adjustment such as assigning resources secured for one print order to another print order.

That is to say, in the case of individually managing each print order, it becomes difficult to grasp information on print orders other than a print order serving as a target being reviewed and/or rescheduled (review target and/or rescheduling target). In this case, for example, it is difficult to perform adjustment such as assigning available resources to this print order serving as a target being reviewed and/or rescheduled.

Furthermore, in the case of individually managing each print order, if there is a trouble concerning the planning or delivery date, for example, adjustment tends to become complicated, such as that it becomes necessary for all the persons concerned to get together for adjustment.

In contrast, in the present exemplary embodiment, a plurality of overview step images 201A are displayed in the form of a list, and it becomes easier to perform adjustment across a plurality of print orders. That is to say, in the present exemplary embodiment, it becomes easier to review and/or reschedule steps or re-assign resources across a plurality of print orders. Furthermore, in the present exemplary embodiment, it becomes possible to utilize surplus resources and to share resources.

That is to say, in the case of reviewing and/or rescheduling the printed material generating steps, if reviewing and/or rescheduling is done individually for each print order, information provided to the reviewer and/or rescheduler tends to be limited to information associated with each print order, and the scope of reviewing and/or rescheduling tends to become narrow.

In contrast, in the present exemplary embodiment, not only information on one print order, but also information on other print orders is provided to the reviewer and/or reschedules. Accordingly, the scope of reviewing and/or rescheduling becomes wider in the case of reviewing and/or rescheduling the printed material generating steps.

The overall display screen 200A illustrated in FIG. 3 will be further described.

In the present exemplary embodiment, the delivery-date-image display unit 302 displays, as illustrated in FIG. 3, an image 205, illustrating the delivery date of each print order (hereinafter referred to as a "delivery date image 205"), in association with a corresponding overview step image 201A.

At this time, in each overview step image 201A, the delivery date image 205 is displayed at a corresponding position on the time axis 203 of the overview step image 201A. In the present exemplary embodiment, a diagram (polygonal line) is displayed as the delivery date image 205.

Here, the situation in the present exemplary embodiment is that the delivery date of the fifth print order from the top will not be met. In the overview step image 201A corresponding to the fifth print order, the delivery date image 205 is positioned on a side of an end 206E of the overview step image 201A that faces a start point 206S.

In the case where the delivery date of a print order will not be met, the delivery-in-transit display unit 304 performs display indicating that the delivery date will not be met in the present exemplary embodiment.

In other words, display indicating that the delivery date will not be met is performed in the present exemplary embodiment in the case where the delivery date image 205 is positioned on a side of the end 206E of the overview step image 201A that faces the start point 206S, and the delivery date of the print order will not be met.

Specifically, the delivery-in-transit display unit 304 changes the color of a portion positioned between the end 206E of the overview step image 201A and the delivery date image 205, as indicated by reference numeral 3A in FIG. 3, which serves as display indicating that the delivery date will not be met.

Specifically, the delivery-in-transit display unit 304 changes the color of a portion positioned between the end 206E of the overview step image 201A and the delivery date image 205 to a color different from the color before the change.

In doing so, the operator in the present exemplary embodiment is notified more clearly of the fact that the delivery date will not be met, compared with the case of not changing the color.

Although display indicating that the delivery date will not be met is performed by changing the color in the present exemplary embodiment, display indicating that the delivery date will not be met is not limited to this and may be displaying text that expresses that the delivery date will not be met.

Specifically, text such as "The delivery date of this print order will not be met" may be displayed.

Figure 4:
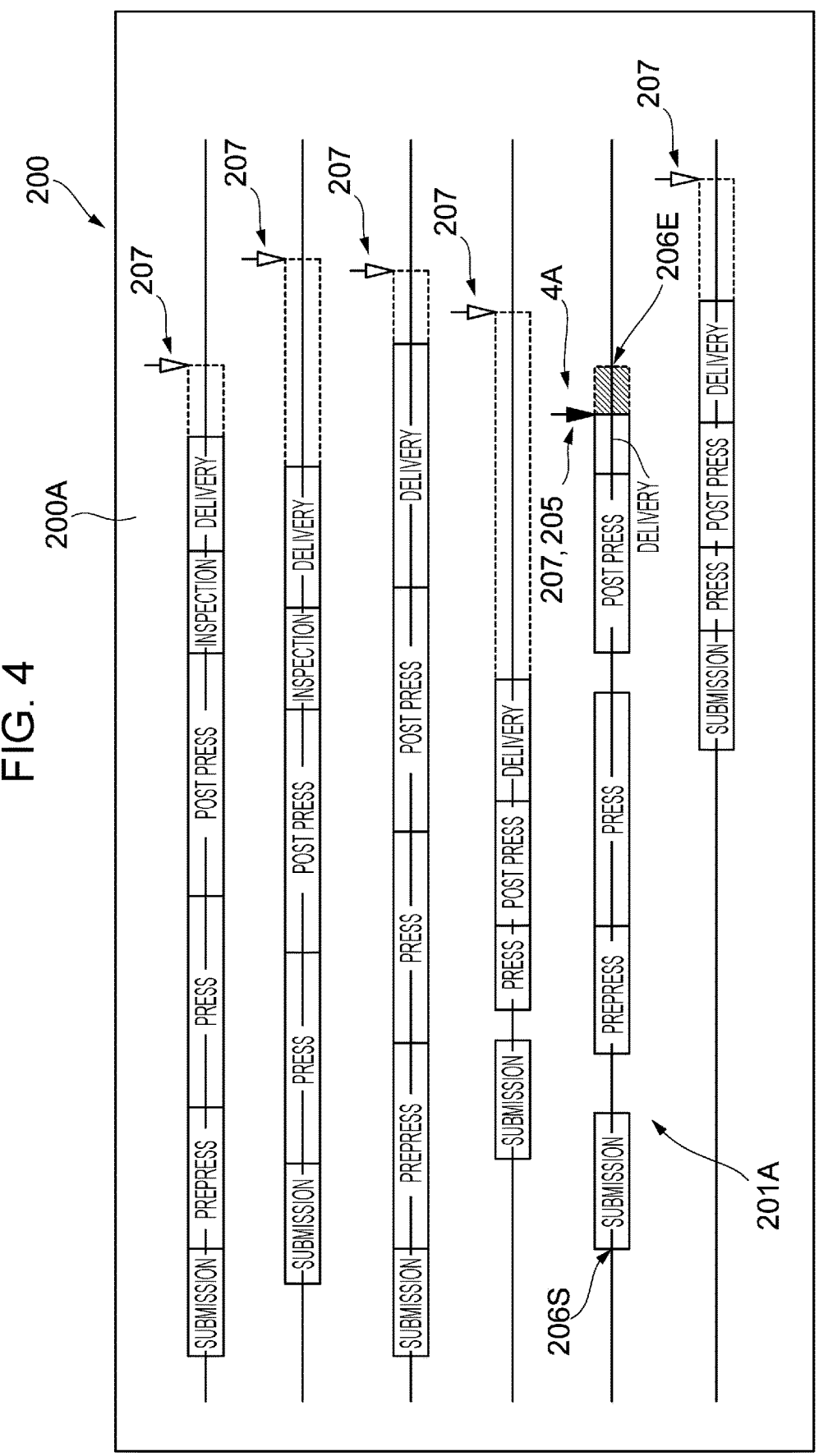
FIG. 4 is a diagram illustrating a display example of an overall display screen.

FIG. 4 is a diagram illustrating another display example of the overall display screen 200A.

In this display example, display indicating that the delivery date will not be met is an icon 207 whose color has been changed. In other words, in this display example, the fact that the delivery date will not be met is displayed by displaying the icon 207 whose color has been changed on a side of the end 206E of the overview step image 201A that faces the start point 206S.

More specifically, in the exemplary embodiment illustrated in FIG. 4, the color of the icon 207 in the case where the delivery date will be met is made different from the color of the icon 207 in the case where the delivery date will not be met.

In the case where the delivery date will not be met, as indicated by reference numeral 4A, the color of the icon 207 is changed, and furthermore the icon 207 whose color has been changed is arranged on a side of the end 206E of the overview step image 201A that faces the start point 206S.

Furthermore, in the display example illustrated in FIG. 4, the color of a portion positioned between the end 206E of the overview step image 201A and the delivery date image 205 (icon 207) is changed.

Here, the "icon 207" refers to an image whose existence is visually recognizable by the operator and whose length (the length in the longitudinal direction of the overview step image 201A) is less than the entire length of the overview step image 201A (the entire length in the longitudinal direction of the overview step image 201A).

There is no particular restriction on the shape of the "icon 207", and the shape may be an arrow shape, as illustrated in FIG. 4, or other shapes such as a polygon and a star shape.

Figure 5:
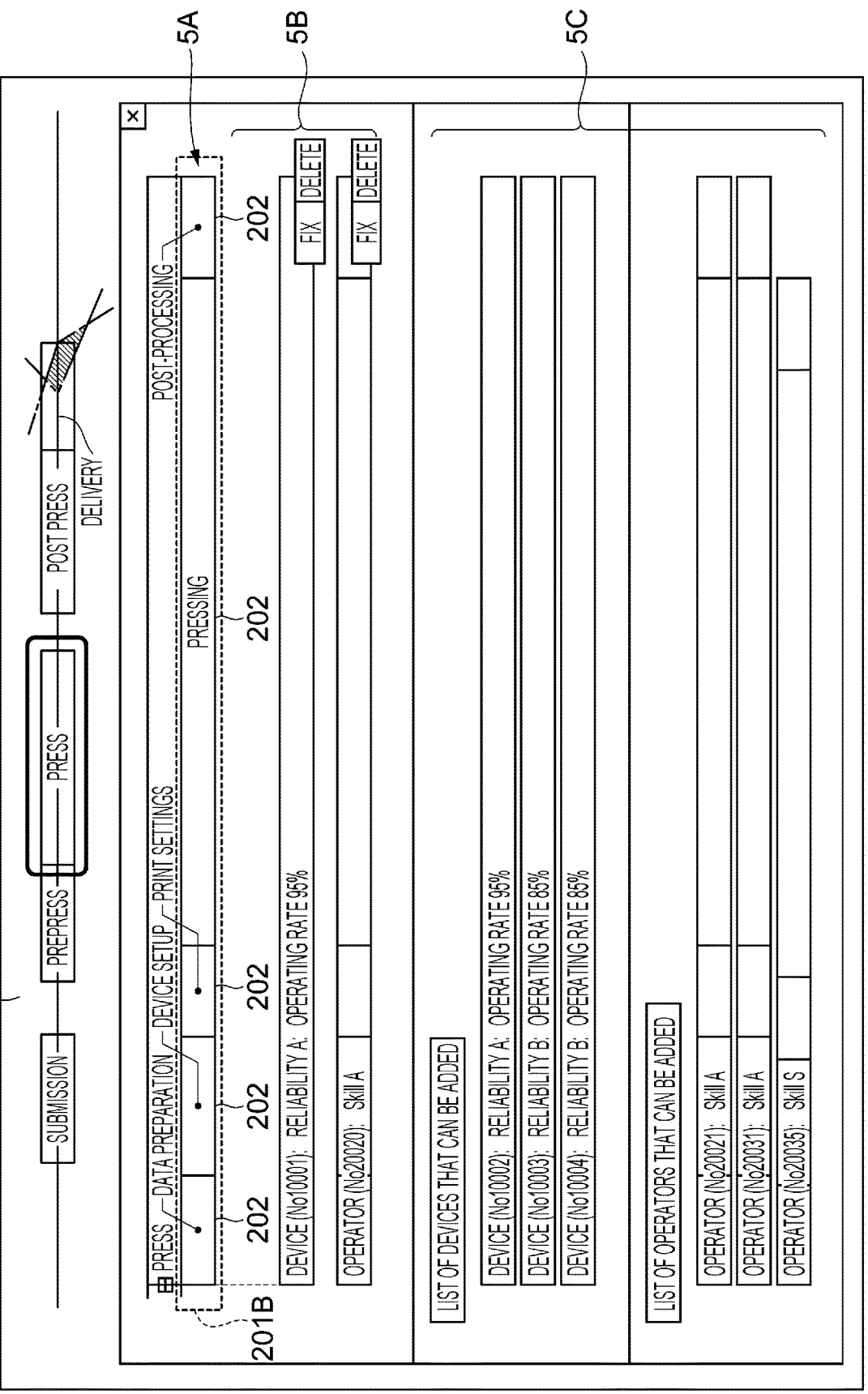
FIG. 5 is a diagram illustrating the display screen after a step is selected by an operator from among a plurality of steps included in an overview step image.

FIG. 5 is a diagram illustrating the display screen after a step 202 is selected by the operator from among a plurality of steps 202 included in an overview step image 201A.

More specifically, FIG. 5 is a diagram illustrating the display screen after a press step, which is included in the fifth overview step image 201A from the top among a plurality of overview step images 201A illustrated in FIG. 3, is selected.

Hereinafter, the display screen illustrated in FIG. 5 will be referred to as a details display screen 200B.

In the present exemplary embodiment, in response to selection, by the operator, of a step 202 (an image representing each step 202), a plurality of steps 202 executed in this step 202 are further displayed.

Specifically, in the present exemplary embodiment, because data preparation, device setup, print settings, pressing, and post-processing are executed in a press step, as indicated by reference numeral 5A in FIG. 5, these steps 202 are displayed on the details display screen 200B.

Here, this portion where these steps 202, namely, data preparation, device setup, print settings, pressing, and post-processing, are arranged may be regarded as a detailed step image 201B.

That is to say, in the present exemplary embodiment, as has been described above, in response to selection, by the operator, of a step 202 that is part of and included in an overview step image 201A, a plurality of steps 202 executed in the selected step 202 are arranged and displayed.

An image where these steps 202 are arranged and are displayed may be regarded as a detailed step image 201B. In the present exemplary embodiment, in response to selection of a step 202 from an overview step image 201A, a detailed step image 201B illustrating the details of the selected step 202 is displayed.

Furthermore, in the present exemplary embodiment, in response to selection of a step 202 from an overview step image 201A, as indicated by reference numeral 5B in FIG. 5, resources that have already been assigned to the step 202 are displayed.

Specifically, in this example, "device (No. 100001)", which serves as an example of material resources, and "operator (No. 20020)", which serves as an example of human resources, are displayed as resources that have already been assigned.

In the present exemplary embodiment, in response to selection of a step 202 from an overview step image 201A, the resource-information display unit 303 displays information on other resources that are different from resources assigned in advance to the selected step 202 and that are usable in the step 202.

More specifically, the resource-information display unit 303 displays information on material resources and information on human resources as information on other resources, as indicated by reference numeral 5C in FIG. 5.

That is to say, the resource-information display unit 303 displays information on resources that are available and usable during that time period as information on other resources.

More specifically, in this display example, the resource-information display unit 303 displays information on three devices (No. 100002, No. 100003, and No. 100004) as information on material resources.

In addition, the resource-information display unit 303 displays information on three operators (No. 20021, No. 20031, and No. 20035) as information on human resources.

The resource-information display unit 303 displays information on the reliability of each device and information on the operating rate of each device as information on three devices (No. 100002, No. 100003, and No. 100004).

Here, information on the reliability refers to information on the failure rate of the device. In addition, information on the operating rate refers to information on a period of time that the device has actually operated per unit time.

In addition, the resource-information display unit 303 displays information on the operation capability of each operator as information on three operators (No. 20021, No. 20031, and No. 20035). Specifically, it is represented that the operator (No. 20021) and the operator (No. 20031) have the same operation capability (represented as "Skill A"). By making the entire length of a detailed step image of the entire press step done by the operator (No. 20035) less than that of the other operators, it is represented that the operator (No. 20035) has a higher operation capability (represented as "Skill S") than the other operators. In other words, besides additionally displaying capability simply by using text information, information on the operation capability is displayed by changing each image itself. By changing each step image in accordance with the operation capability of human resources such as operators or material resources such as devices, it becomes possible for the operator to easily select a human resource or a material resource that contributes to shortening the overall processing time.

Although the case in which both information on material resources and information on human resources are displayed as information on usable resources has been described by way of example in the present exemplary embodiment, only one of them may be displayed.

In addition, although the case in which information on other resources is displayed in response to selection, by the operator, of a step 202 has been described in the present exemplary embodiment, information on other resources may be displayed regardless of selection of a step 202.

Specifically, for example, as has been described above, information on other resources may be automatically displayed in the case where the delivery date image 205 is positioned on a side of the end 206E of the overview step image 201A that faces the start point 206S, and the situation is that the delivery date will not be made.

Figure 6:
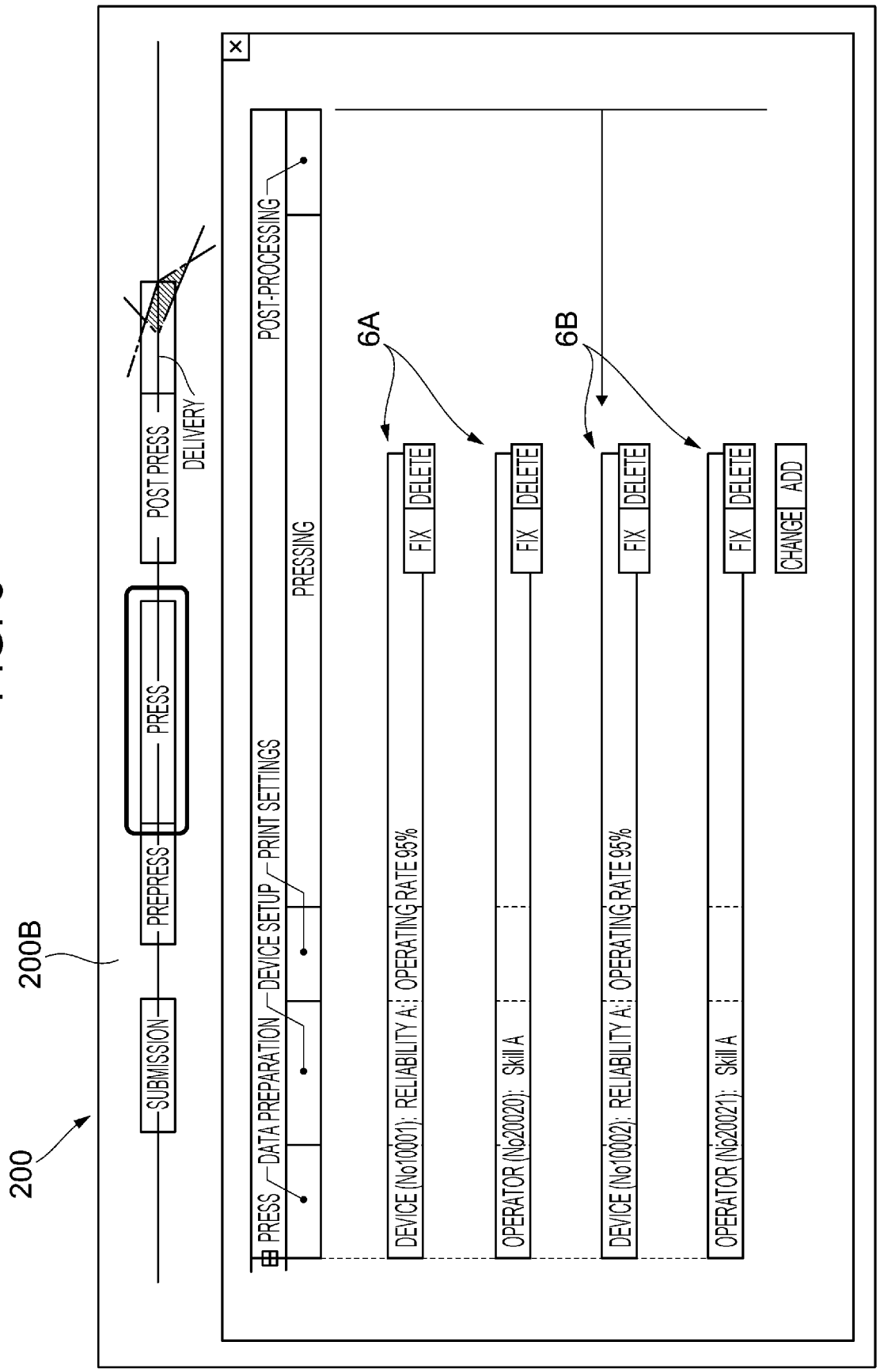
FIG. 6 is a diagram illustrating a details display screen in the case where other resources are selected by the operator.

FIG. 6 is a diagram illustrating the details display screen 200B in the case where other resources displayed in FIG. 5 are selected by the operator.

Specifically, FIG. 6 is a diagram illustrating the details display screen 200B in the case where the device (No.

100002) and the operator (No. 20021), which are other resources displayed in FIG. 5, are selected by the operator.

In the present exemplary embodiment, in response to selection, by the operator, of any of the other resources, a process of displaying the details display screen 200B is performed on the assumption that the selected other resources are used.

Specifically, although display in FIG. 5 is on the assumption that the device (No. 100001) and the operator (No. 20020) are used, the details display screen 200B after other resources are selected is, as illustrated in FIG. 6, display on the assumption that the device (No. 100001), the device (No. 100002), the operator (No. 20020), and the operator (No. 20021) are used.

That is to say, in the present exemplary embodiment, in response to selection of other resources, the details display screen 200B is switched from the state illustrated in FIG. 5 to the state illustrated in FIG. 6.

On the details display screen 200B illustrated in FIG. 6, the device (No. 100002) and the operator (No. 20021) are displayed as newly assigned resources.

Furthermore, on the details display screen 200B illustrated in FIG. 6, the entire length of each of images (images indicated by reference numeral 6A) illustrating resources assigned from the beginning becomes shorter than the entire length illustrated in FIG. 5. From this, it is clear that the time required for the entire processing in the press step is shortened. In other words, the effect that the processing time is shortened by introducing additional resources is confirmed beforehand.

In addition, in the present exemplary embodiment, the entire length of each of images (images indicated by reference numeral 6B) illustrating newly assigned resources is displayed to be equal to the entire length of each image illustrating resources assigned from the beginning.

In the present exemplary embodiment, in response to selection of other resources, in addition to resources assigned from the beginning, the selected other resources (newly assigned resources) are also used in processing in the press step, thereby shortening the overall processing time of the press step.

More specifically, in the present exemplary embodiment, as illustrated in FIG. 6, the time required for pressing, which is included in the press step, is particularly shortened, and accordingly the overall processing time of the press step is shortened.

Figure 7:
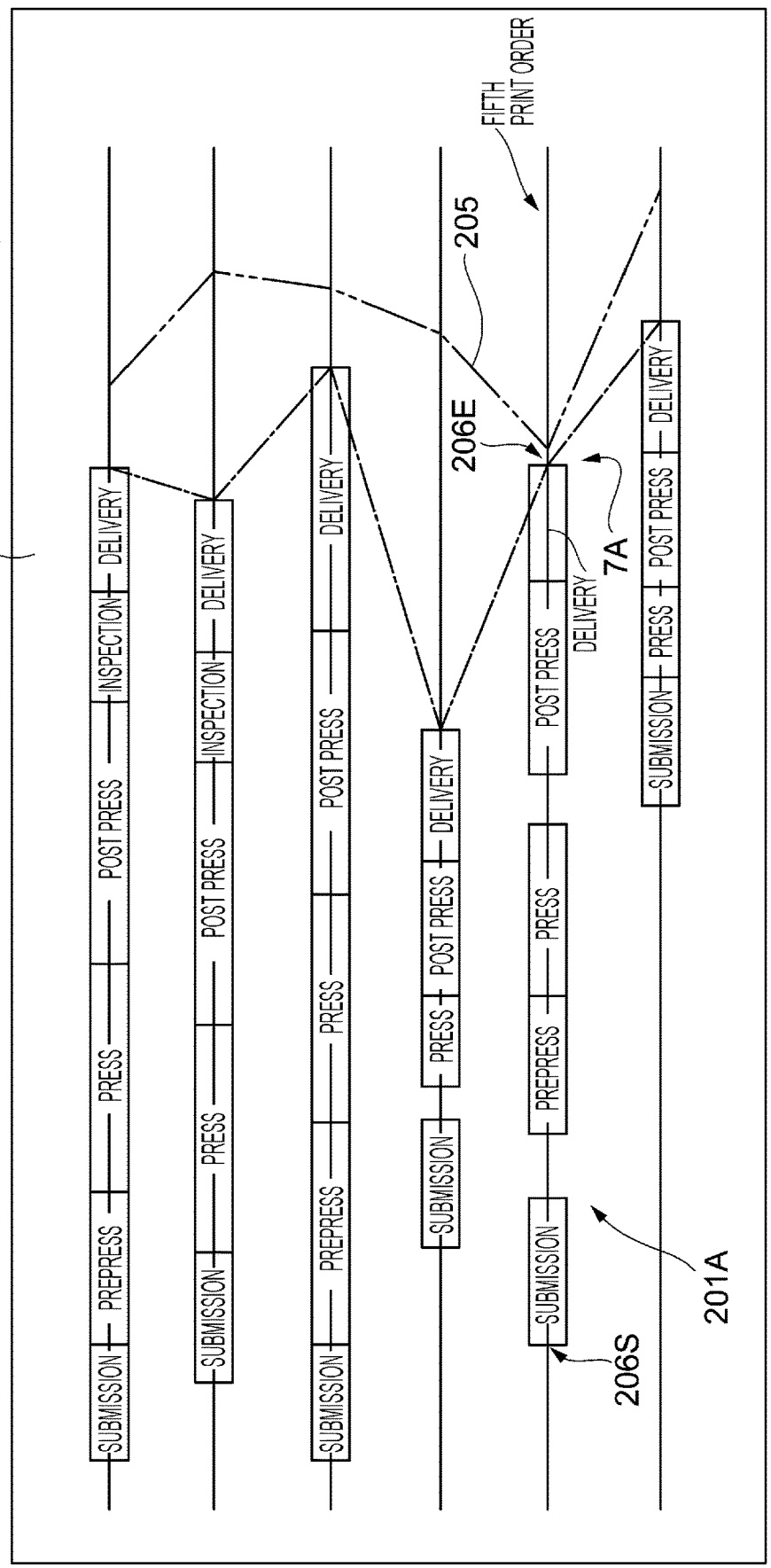
FIG. 7 is a diagram illustrating the overall display screen in the case where other resources are selected by the operator.

FIG. 7 is a diagram illustrating the overall display screen 200A after other resources are selected by the operator.

In the present exemplary embodiment, in response to pressing, by the operator, of a predetermined operation button (not illustrated), the details display screen 200B illustrated in FIG. 6 is switched to the overall display screen 200A illustrated in FIG. 7.

In the present exemplary embodiment, in the case where the overall display screen 200A is displayed after other resources are selected by the operator, the step-image change unit 305 changes the overview step image 201A displayed on the overall display screen 200A.

Specifically, the step-image change unit 305 changes the fifth overview step image 201A from the top, which illustrates a printed material generating step in which the other resources are used.

Specifically, the step-image change unit 305 changes the entire length of the fifth overview step image 201A from the top. More specifically, the step-image change unit 305 shortens the entire length of the fifth overview step image 201A from the top.

That is to say, the step-image change unit 305 changes the position of the end 206E of the fifth overview step image 201A. In other words, the step-image change unit 305 changes the position of the end 206E of the overview step image 201A such that the end 206E will become closer to the start point 206S.

In the present exemplary embodiment, as has been described above, the processing time of the press step is shortened, and accordingly the entire processing time of the printed material generating step is also shortened.

In this case, the step-image change unit 305 shortens the entire length of the fifth overview step image 201A from the top, as illustrated in FIG. 7.

Specifically, in changing of the fifth overview step image 201A, the step-image change unit 305 calculates the processing time (estimated processing time) in the case where a printed material generating step illustrated by the fifth overview step image 201A is executed using resources assigned from the beginning and the selected other resources.

Next, the step-image change unit 305 changes the fifth overview step image 201A on the basis of the calculated processing time.

More specifically, in the present exemplary embodiment, the processing time of the entire printed material generating step and the entire length of the overview step image 201A have a proportional relationship. The step-image change unit 305 changes the entire length of the fifth overview step image 201A in accordance with an increase/decrease in the calculated processing time.

Here, in the present exemplary embodiment, the entire length of the fifth overview step image 201A is shortened as a result of using the above-mentioned other resources. Accordingly, in this example, as indicated by reference numeral 7A in FIG. 7, the delivery date image 205 becomes positioned on the right side of the end 206E of the overview step image 201A, and accordingly, display indicating that the delivery date will not be met disappears.

In processing in the present exemplary embodiment, available resources are provided to a step 202 that requires these resources, thereby shortening the work period of this step 202.

Figure 8:
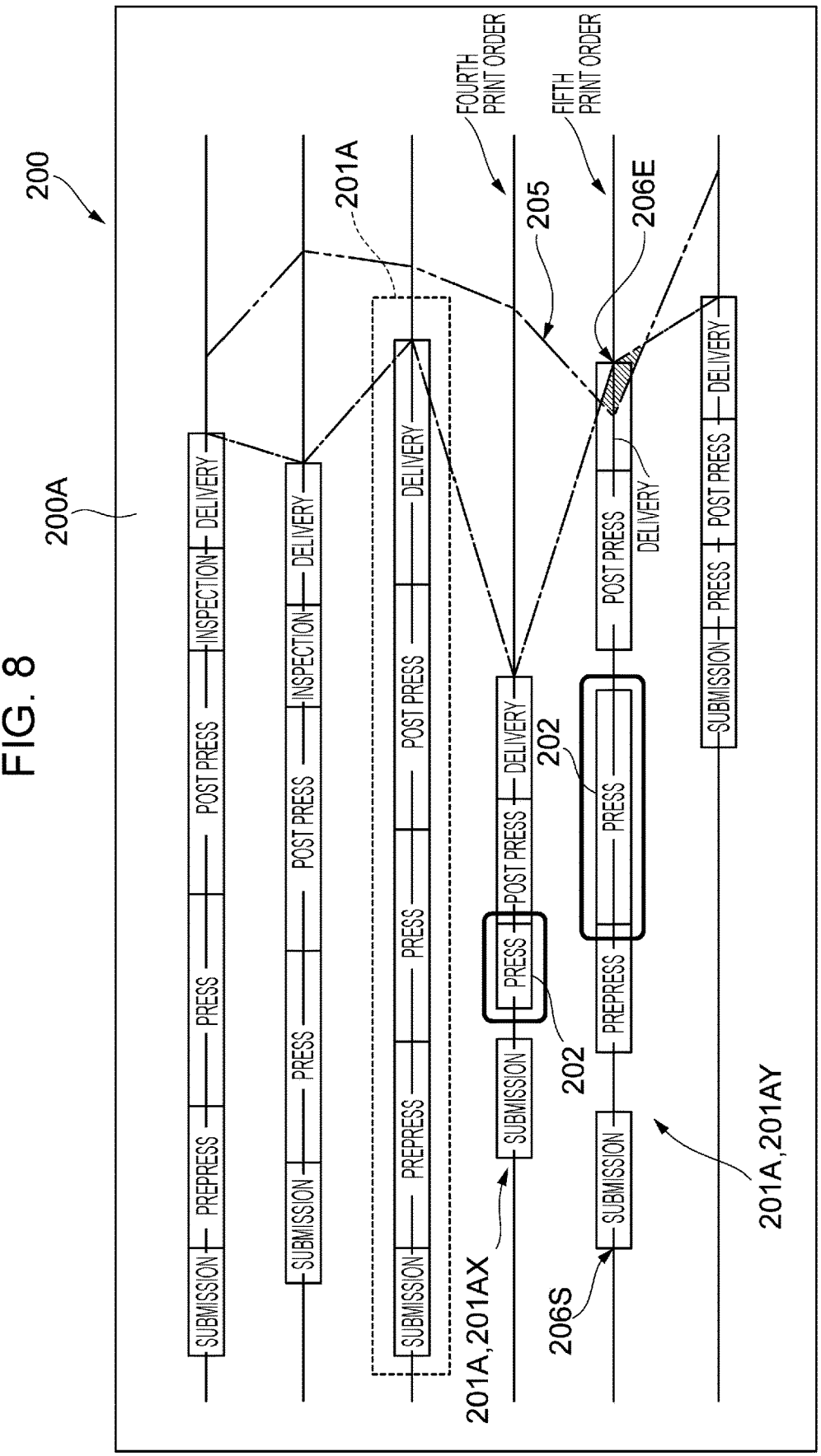
FIG. 8 is a diagram illustrating the overall display screen.

Next, a second exemplary embodiment will be described. Also in the second exemplary embodiment, as has been described above and as illustrated in FIG. 8 (a diagram illustrating the overall display screen 200A in the second exemplary embodiment), a plurality of overview step images 201A are displayed on the overall display screen 200A.

Furthermore, also in the second exemplary embodiment, display indicating that the delivery date will not be met is performed in the fifth overview step image 201A.

In the second exemplary embodiment, processing in the case where two press steps, namely, a press step of the fourth overview step image 201A and a press step of the fifth overview step image 201A, are selected by the operator in order to meet the delivery date will be described by way of example.

In other words, processing in the case where one step 202 is selected from a first overview step image 201A (hereinafter referred to as a "first overview step image 201AX"), another step 202 is selected from a second overview step image 201A (hereinafter referred to as a "second overview step image 201AY"), and a total of two steps 202 (a plurality of steps 202) are selected will be described.

Figure 9:
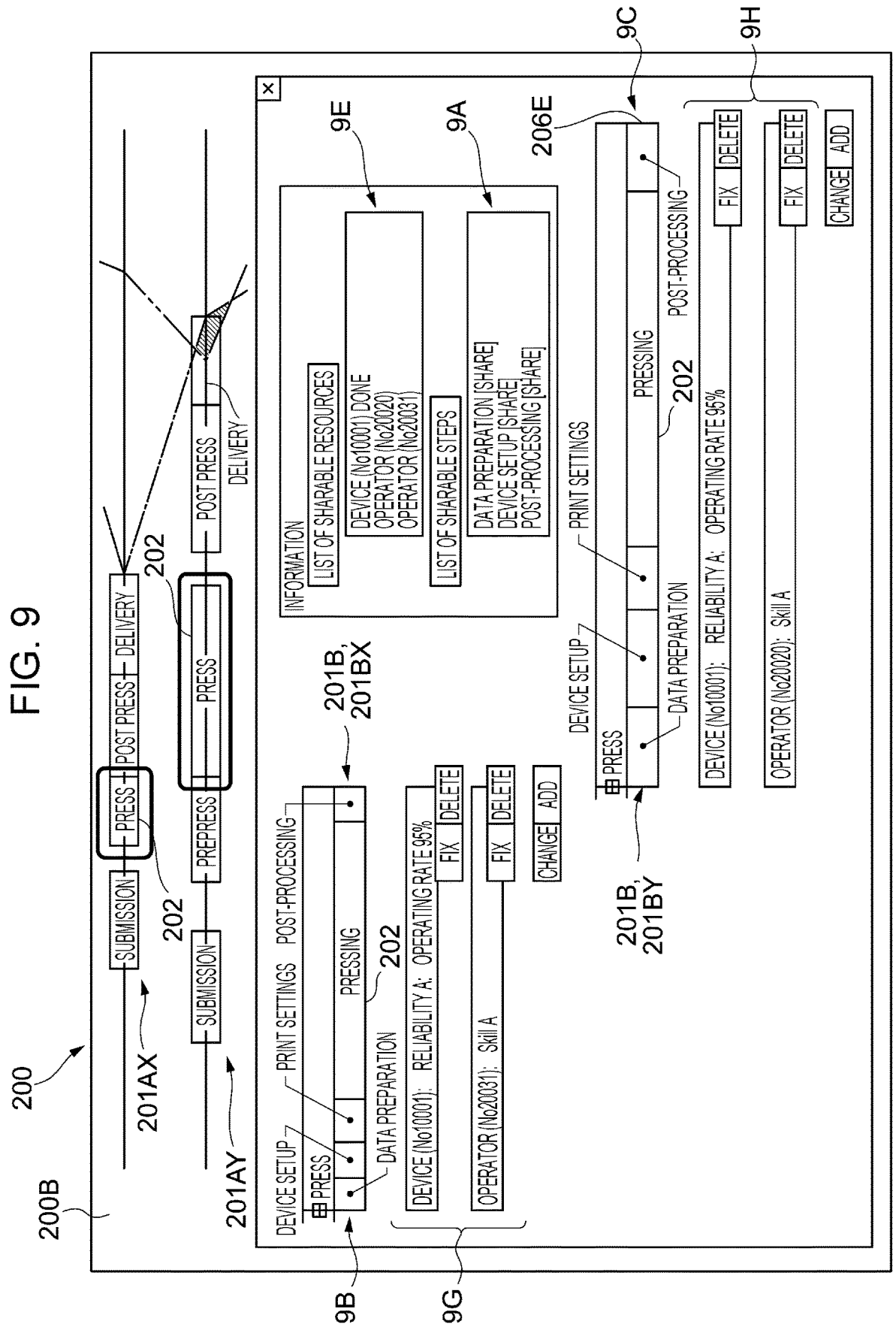
FIG. 9 is a diagram illustrating the details display screen after two steps are selected.

FIG. 9 is a diagram illustrating the details display screen 200E after two steps 202 are selected.

In the present exemplary embodiment, as has been described above, in response to selection of one step 202 from the first overview step image 201AX and selection of another step 202 from the second overview step image 201AY, as indicated by reference numeral 9A in FIG. 9, the common-process display unit 306 displays common processes that are common to these steps 202.

In other words, common processes executed in two printed material generating steps, namely, a first printed material generating step and a second printed material generating step, are displayed on the details display screen 200B.

In the present exemplary embodiment, as has been described above, in response to selection of a step 202 from each of two overview step images 201A to select two steps 202, as indicated by reference numerals 9B and 9C in FIG. 9, detailed step images 201B in which a plurality of steps 202 executed in each of these steps 202 are arranged are displayed.

That is to say, in the present exemplary embodiment, in response to selection, by the operator, of a plurality of steps 202 included in overview step images 201A, detailed step images 201B illustrating the details of the selected steps 202, respectively, are displayed.

In each of the detailed step images 201B, like the overview step images 201A, as indicated by reference numerals 9B and 9C in FIG. 9, a plurality of steps 202 are arranged on the time axis 203 and are displayed.

Furthermore, in the present exemplary embodiment, as indicated by reference numerals 9B and 9C, the detailed step images 201B are displayed for the individual print orders.

Here, the case in which two press steps are selected is discussed in this example. In the present exemplary embodiment, a detailed step image 201B is displayed for each of these press steps (a total of two detailed step images 201B are displayed).

Hereinafter, in the present specification, one detailed step image 201B (a detailed step image 201B positioned in the upper left-hand corner of FIG. 9) is referred to as a first detailed step image 201BX, and the other detailed step image 201B (a detailed step image 201B positioned in the lower right-hand corner of FIG. 9) is referred to as a second detailed step image 201BY.

In the present exemplary embodiment, as has been described above, the common-process display unit 306 displays information on common processes.

This information on common processes is displayed at a place different from places where the first detailed step image 201BX and the second detailed step image 201BY are displayed.

Specifically, the common-process display unit 306 displays common processes executed in two printed material generating steps, namely, a printed material generating step represented by the first detailed step image 201BX and a printed material generating step represented by the second detailed step image 201BY, at a place different from places where the first detailed step image 201BX and the second detailed step image 201BY are displayed.

Furthermore, in the present exemplary embodiment, as indicated by reference numeral 9A, the common-process display unit 306 displays text expressing the details of the common processes as information on the common processes.

Specifically, the common-process display unit 306 displays "data preparation", "device setup", and "post-processing" as information on the common processes.

Furthermore, in the present exemplary embodiment, as indicated by reference numeral 9E, information on resources that are sharable by (usable in) two printed material generating steps, namely, a printed material generating step represented by the first detailed step image 201BX and a printed material generating step represented by the second detailed step image 201BY, is displayed. Specifically, information on material resources and information on human resources are displayed.

More specifically, in the present exemplary embodiment, the operator (No. 20020) and the operator (No. 20031) are displayed as information on human resources that are sharable.

In the present exemplary embodiment, in response to selection of either operator, this selected operator is assigned to the above-mentioned two printed material generating steps (a printed material generating step represented by the first detailed step image 201BX and a printed material generating step represented by the second detailed step image 201BY).

That is to say, in the present exemplary embodiment, the operator (No. 20031) is assigned in advance to a printed material generating step represented by the first detailed step image 201BX, and the operator (No. 20020) is assigned in advance to a printed material generating step represented by the second detailed step image 201BY.

In the present exemplary embodiment, as has been described above, in response to selection of either operator, this selected operator is assigned to two printed material generating steps (a printed material generating step represented by the first detailed step image 201BX and a printed material generating step represented by the second detailed step image 201BY).

Furthermore, in the present exemplary embodiment, as indicated by reference numeral 9E, the device (No. 100001) is displayed as information on material resources that are sharable.

In the present exemplary embodiment, this device (No. 100001) has already been assigned to two printed material generating steps, namely, a printed material generating step represented by the first detailed step image 201BX and a printed material generating step represented by the second detailed step image 201BY, and this device (No. 100001) is already in a shared state.

That is to say, processing in two printed material generating steps is performed by one device (No. 100001) from the beginning in this example, and this one device (No. 100001) is already in a shared state even if the operator selects no device.

Furthermore, in the present exemplary embodiment, the resource-information display unit 303 displays information on resources used in processing in each printed material generating step in association with each of the above-mentioned two detailed step images 201B (the first detailed step image 201BX and the second detailed step image 201BY).

Specifically, the resource-information display unit 303 displays, in association with the first detailed step image 201BX, information on resources used in processing in a printed material generating step represented by this first detailed step image 201BX.

Specifically, the resource-information display unit 303 displays, as indicated by reference numeral 9G, the device (No. 100001) and the operator (No. 20031) in association with the first detailed step image 201BX.

Furthermore, the resource-information display unit 303 displays, in association with the second detailed step image 201BY, information on resources used in processing in a printed material generating step represented by this second detailed step image 201BY.

Specifically, the resource-information display unit 303 displays, as indicated by reference numeral 9H, the device (No. 100001) and the operator (No. 20020) in association with the second detailed step image 201BY.

Furthermore, as has been described above, in displaying of information on each device, information on the reliability and the operating rate of the device is displayed; and, in displaying of information on each operator, information on the capability of the operator is displayed.

Figure 10:
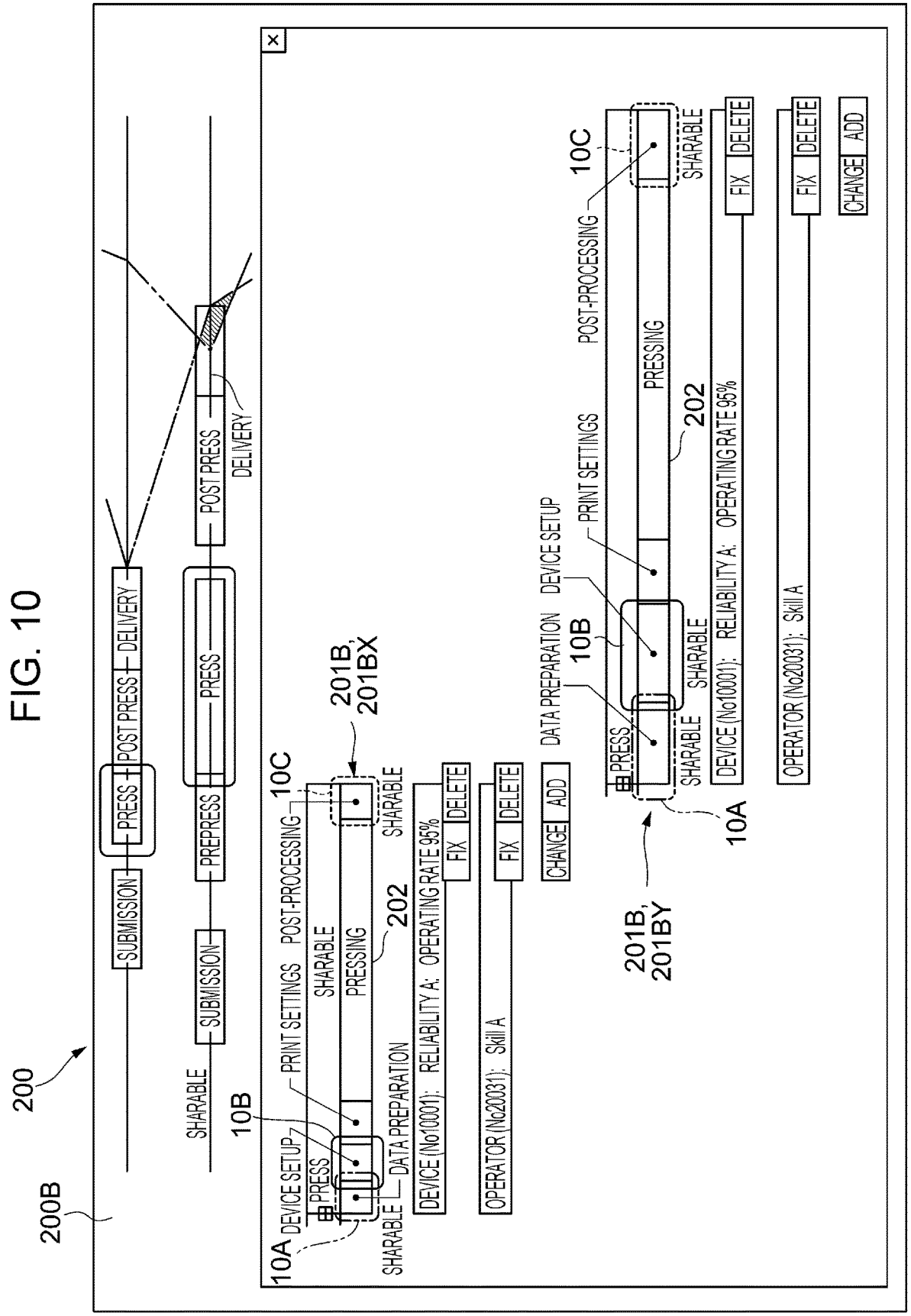
FIG. 10 is a diagram illustrating another display example of the details display screen.

As a form of displaying common processes, alternatively, as illustrated in FIG. 10 (a diagram illustrating another display example of the details display screen 200B), an image may be displayed in association with each of steps 202 in which common processes are executed, among a plurality of steps included in each of the first detailed step image 201BX and the second detailed step image 201BY, thereby displaying the common processes.

Specifically, in the display example illustrated in FIG. 10, colored frame images (such as red frame images) (rectangular images indicated by reference numerals 10A, 10B, and 10C) are displayed in association with steps 202 in which "data preparation", "device setup", and "post processing", which are the common processes, are executed, among a plurality of steps 202 included in each of the first detailed step image 201BX and the second detailed step image 201BY.

Furthermore, the text "shareable" is displayed in association with each of these steps 202 where the common processes are executed.

Figure 11:
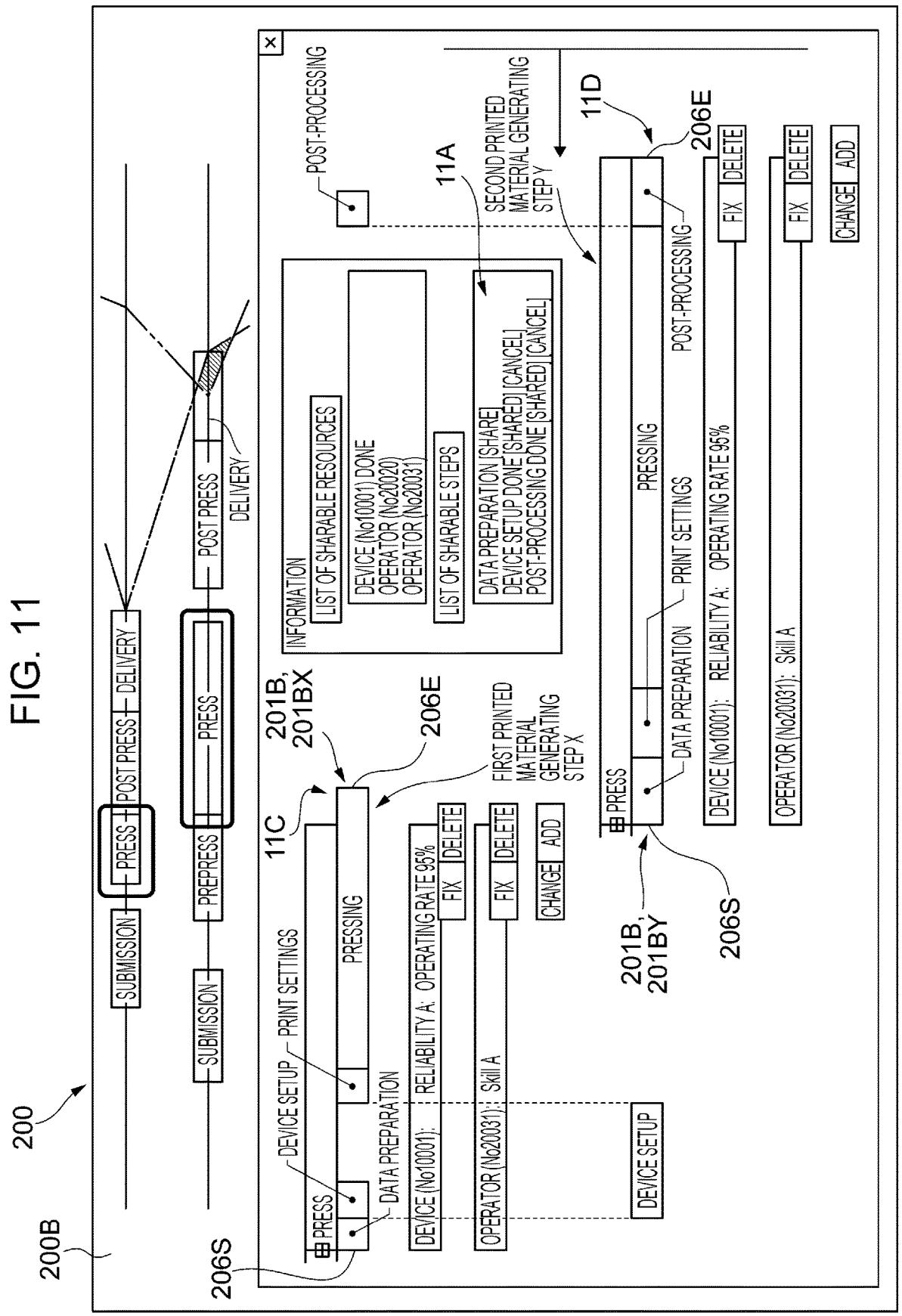
FIG. 11 is a diagram illustrating the details display screen after any of common processes is selected by the operator.

FIG. 11 is a diagram illustrating the details display screen 200B after any of the common processes is selected by the operator. More specifically, FIG. 11 is a diagram illustrating the details display screen 200B after "device setup" and "post-processing" are selected by the operator.

In the present exemplary embodiment, in response to selection, by the operator, of any of the common processes, as indicated by reference numeral 11A, "done" and "shared" are displayed to indicate that the common processes have been selected.

In the present exemplary embodiment, the selection item "cancel" is also displayed; and, in response to selection of this item, the selected common processes become unselected.

Furthermore, in the present exemplary embodiment, in response to selection of a common process, the common process is collectively executed in a first printed material generating step (hereinafter referred to as a "first printed material generating step X") represented by the first detailed step image 201BX executed first and/or a second printed material generating step (hereinafter referred to as a "second printed material generating step Y") represented by the second detailed step image 201BY executed later.

Specifically, in this example, "device setup" is collectively executed in the first printed material generating step X, which is executed first, and "post-processing" is collectively executed in the second printed material generating step Y, which is executed later.

Furthermore, in the present exemplary embodiment, in accordance with this, as indicated by reference numerals 11C and 11D in FIG. 11, the first detailed step image 201BX and the second detailed step image 201BY are changed.

In the present exemplary embodiment, in response to selection of a common process by the operator, the step-image change unit 305 changes at least one detailed step image 201B of the first detailed step image 201BX and the detailed step image 201BY. Note that both of the detailed step images 201B are changed in the present exemplary embodiment.

Specifically, in the present exemplary embodiment, as has been described above, "device setup" is selected, and "device setup" is collectively executed in the first printed material generating step X, which is executed first. In accordance with this, the step-image change unit 305 changes the first detailed step image 201BX.

In addition, in the present exemplary embodiment, as has been described above, "post-processing" is selected, and "post-processing" is collectively executed in the second printed material generating step Y, which is executed later. In accordance with this, the step-image change unit 305 changes the second detailed step image 201BY.

Specifically, the step-image change unit 305 changes the entire length of the first detailed step image 201BX and the second detailed step image 201BY. In other words, the step-image change unit 305 changes the position of the end 206E of the first detailed step image 201BX and the second detailed step image 201BY.

More specifically, in the present exemplary embodiment, for the first detailed step image 201BX, the end 206E is moved away from the start point 206S to lengthen the entire length of the first detailed step image 201BX.

In addition, for the second detailed step image 201BY, the end 206E is moved closer to the start point 206S to shorten the entire length of the second detailed step image 201BY.

More specifically, in changing of the first detailed step image 201BX, the step-image change unit 305 first calculates the processing time in the case of executing the first printed material generating step X represented by the first detailed step image 201BX.

In the present exemplary embodiment, one of the common processes (device setup) is collectively executed in the first printed material generating step X. At the same time, another of the common processes (post-processing) is omitted in this first printed material generating step X.

Therefore, in changing of the first detailed step image 201BX, the step-image change unit 305 calculates the processing time in the case where one of the common processes (device setup) is collectively executed in the first printed material generating step X, and another of the common processes (post-processing) is not executed (omitted) in the first printed material generating step X.

That is to say, the step-image change unit 305 calculates the processing time that is in the case of executing the first printed material generating step X, which is executed first, and that is in the case where "device setup" is collectively executed but execution of "post-processing" is omitted in this first printed material generating step X.

On the basis of the calculated processing time, the step-image change unit 305 changes the first detailed step image 201BX, which illustrates the first printed material generating step X.

In addition, in changing of the second detailed step image 201BY, the step-image change unit 305 calculates the processing time in the case where one of the common processes (device setup) is omitted in the second printed material generating step Y, and another of the common processes (post-processing) is collectively executed in the second printed material generating step Y.

On the basis of the calculated processing time, the step-image change unit 305 changes the second detailed step image 201BY, which illustrates the second printed material generating step Y.

In the present exemplary embodiment, because "device setup" is collectively executed in the first printed material generating step X, this elongates the time required for the first printed material generating step X.

In contrast, because execution of "post-processing" is omitted in the first printed material generating step X, the time required for the first printed material generating step X becomes shorter for the amount equivalent to omission of this "post-processing".

In addition, because "device setup" is omitted in the second printed material generating step Y, the time required for the second printed material generating step Y becomes shorter.

In contrast, because "post-processing" is collectively executed in the second printed material generating step Y, the time required for the second printed material generating step Y becomes longer for the amount equivalent to this "post-processing".

In this example, the effect of time reduction by omitting "device setup" is great in the second printed material generating step Y, and, as illustrated in FIG. 11, the position of the end 206E of the second detailed step image 201BY is moved to the left of the initial position (the position of the end 206E in FIG. 9) in the second printed material generating step Y.

Accordingly, the entire length of the detailed step image 201BY becomes shorter. In this case, the time required for the second printed material generating step Y becomes shorter.

Figure 12:
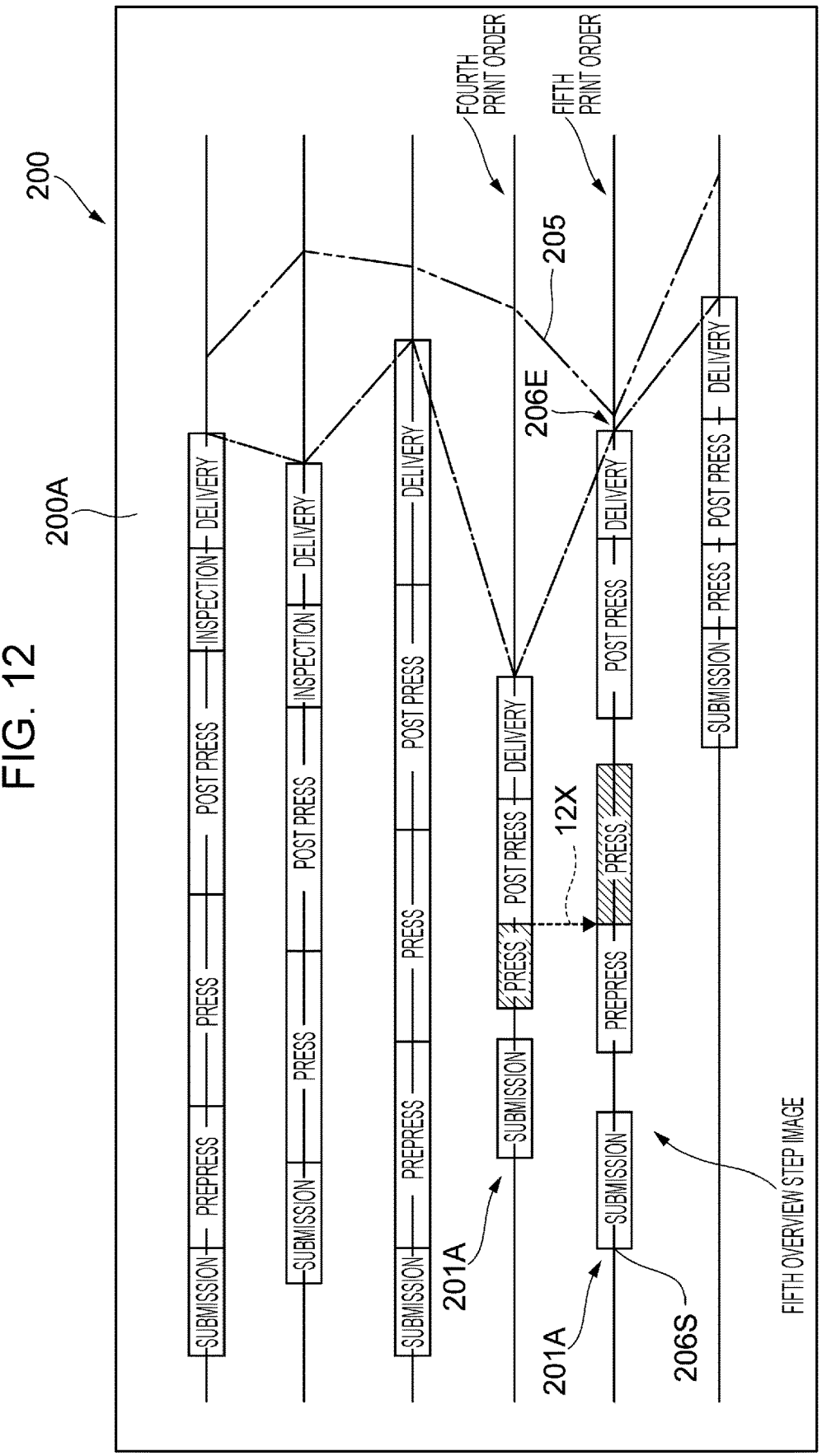
FIG. 12 is a diagram illustrating the overall display screen after a common process is selected.

FIG. 12 is a diagram illustrating the overall display screen 200A after one or more common processes are selected.

Specifically, FIG. 12 is a diagram illustrating the overall display screen 200A after "device setup" and "post-processing", which are common processes, are selected.

In the present exemplary embodiment, in response to selection of a common process, as has been described above, detailed step images 201B are changed. In this case, in the present exemplary embodiment, the related-image change unit 307 changes overview step images 201A in response to changes of the detailed step images 201B.

Specifically, in response to changes of detailed step images 201B, the related-image change unit 307 changes overview step images 201A that are images related to the detailed step images 201B.

That is to say, in response to changes of detailed step images 201B, the related-image change unit 307 changes overview step images 201A, each illustrating a printed material generating step in which steps illustrated by a corresponding one of the detailed step images 201B are executed.

More specifically, the related-image change unit 307 changes the entire length of each overview step image 201A by at least changing the position of the end 206E of the overview step image 201A.

More specifically, in the present exemplary embodiment, the fourth overview step image 201A from the top and the fifth overview step image 201A from the top in FIG. 12 are related images, and these related images are changed.

Specifically, the entire length of each of the related images is changed. Specifically, in the present exemplary embodiment, the entire length of the fourth overview step image 201A is changed to become longer, and the entire length of the fifth overview step image 201A is changed to become shorter.

In description of the fifth overview step image 201A, in the present exemplary embodiment, because the entire length of the second detailed step image 201BY (the detailed step image 201B indicated by reference numeral 11D in FIG. 11) is shortened as described above, this shortens the entire length of the fifth overview step image 201A (see FIG. 12), which is related to the second detailed step image 201BY.

In the present exemplary embodiment, as the entire length of the fifth overview step image 201A becomes shorter, as illustrated in FIG. 12, the delivery date image 205 becomes positioned at a place away from the end 206E of the fifth overview step image 201A. In other words, the delivery date image 205 becomes positioned on the opposite side of the start point 206S, with the end 206E interposed therebetween.

Accordingly, in the present exemplary embodiment, it is displayed for the fifth overview step image 201A that the delivery date will be met.

In the present exemplary embodiment, a printed material generated by a printed material generating step illustrated by the fourth overview step image 201A and a printed material generated by a printed material generating step illustrated by the fifth overview step image 201A are treated as different products.

In the present exemplary embodiment, resources may be shared in manufacturing such different products.

Furthermore, on the overall display screen 200A illustrated in FIG. 12, the already-selected display unit 308 performs display indicating that a common process has been selected (display indicating that resources are being shared).

Specifically, in the present exemplary embodiment, a line 12X, which connects the fourth overview step image 201A and the fifth overview step image 201A, is displayed to serve as display indicating that a common process has been selected.

More specifically, a broken arrow directed from the fourth overview step image 201A to the fifth overview step image 201A is displayed.

In other words, in the present exemplary embodiment, sharing based on a common process takes place in a press step included in the fourth overview step image 201A and a press step included in the fifth overview step image 201A.

In the present exemplary embodiment, this causes display to be performed indicating that there is a connection between a press step included in the fourth overview step image 201A and a press step included in the fifth overview step image 201A.

Figure 13:
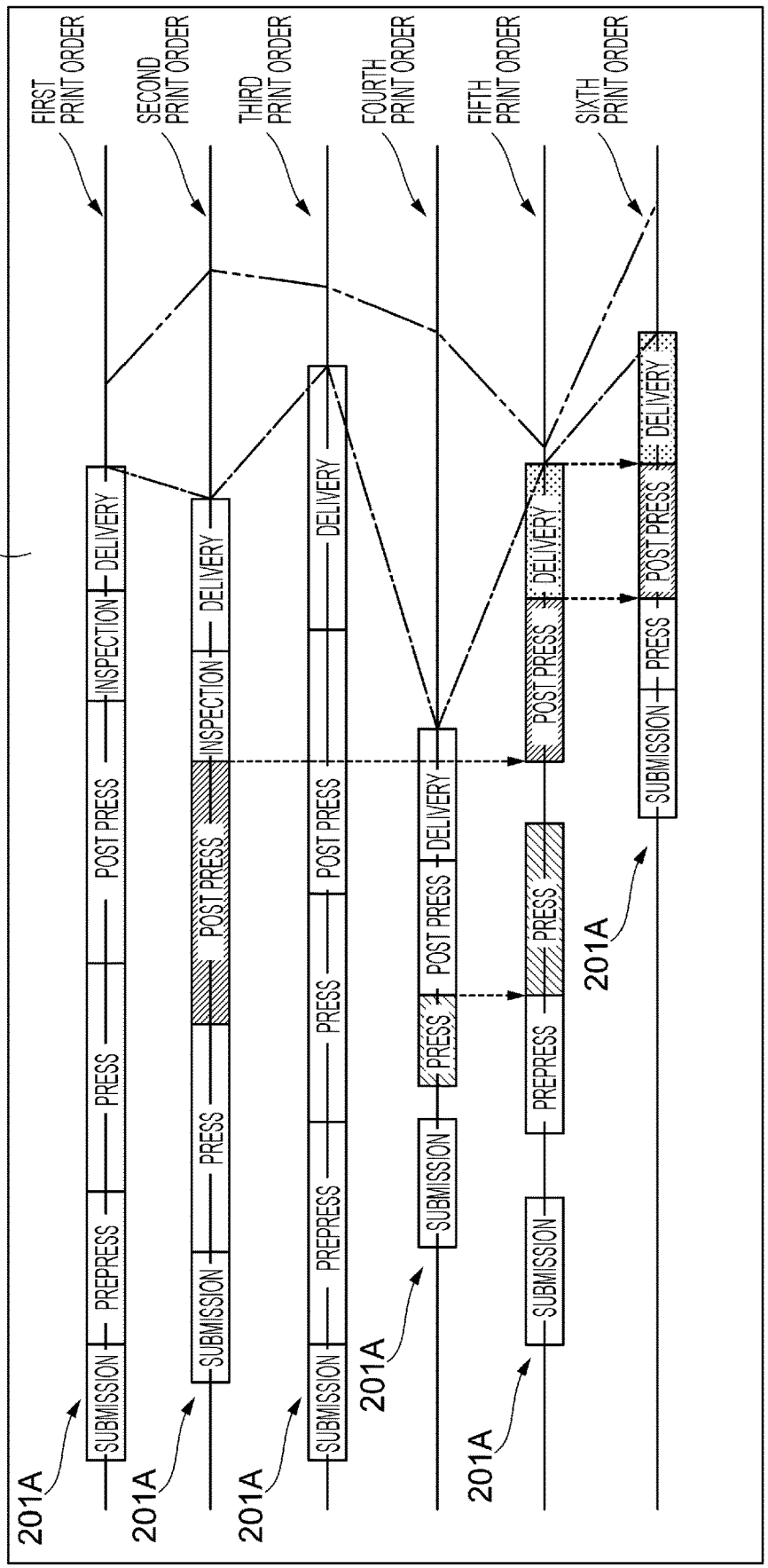
FIG. 13 is a diagram illustrating another display example of the overall display screen.

FIG. 13 is a diagram illustrating another display example of the overall display screen 200A.

On the overall display screen 200A, as has been described above, display indicating that a common process has been selected is performed (display indicating that there is a connection between a plurality of printed material generating steps is performed).

Specifically, the case in which a common process executed in three printed material generating steps, namely, a printed material generating step illustrated by the second overview step image 201A, a printed material generating step illustrated by the fifth overview step image 201A, and a printed material generating step illustrated by the sixth overview step image 201A, has been selected is discussed in this example.

Specifically, the case in which a common process executed by three post press steps has been selected is discussed.

A common process to be selected is not limited to one executed in two printed material generating steps, and may be one executed in more than two printed material generating steps.

In addition, in selection of a common process executed in more than two printed material generating steps, at first, a common process executed in two printed material generating steps may be selected to enable sharing, and then a common process may be selected between the afore-selected common process enabling sharing and one or more common processes executed in the third printed material generating step.

Furthermore, the case in which a common process executed in two printed material generating steps, namely, a printed material generating step illustrated by the fifth overview step image 201A and a printed material generating step illustrated by the sixth overview step image 201A, has been selected is discussed in this example.

Specifically, the case in which a common process executed in a delivery step included in a printed material generating step illustrated by the fifth overview step image 201A and in a delivery step included in a printed material generating step illustrated by the sixth overview step image 201A has been selected is discussed in this example.

Others

The functional units illustrated in FIG. 2 may be realized by one device (computer). Alternatively, the function units may be arranged in a distributed manner in a plurality of devices, and the devices may cooperate to realize the above-mentioned respective functions.

In addition, the present disclosure is not limited to the above-described exemplary embodiments and includes various modifications. The above-described exemplary embodiments are detailed descriptions for clearly describing the present disclosure, and need not necessarily include all the configurations described. In other words, the above-described exemplary embodiments are merely one example, and a known configuration may be added to the above-described exemplary embodiments, a part of the exemplary embodiments may be deleted, or a part of the exemplary embodiments may be replaced with a known configuration.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A display system comprising:
a processor configured to
control a display to display step images in parallel on a time axis, for each print order, each of the step images in which a plurality of steps that each execute a process using a resource assigned in advance are arranged on the time axis, each of the step images illustrating a printed material generating step;
control the display to display an image illustrating a delivery date of each print order at a corresponding position on the time axis; and
control the display to display information on another resource that is different from the resource assigned in advance to each of the steps and that is usable in each of the steps.

2. The display system according to claim 1, wherein the processor further configured to control the display to display information on another resource usable in a step selected from among the plurality of steps.

3. The display system according to claim 1, wherein the processor further configured to control the display to display information on a human resource and/or information on a material resource as the information on the another resource.

4. The display system according to claim 1,
wherein the processor further configured to control the display to perform display indicating that the delivery date will not be met in a case where the image illustrating the delivery date is positioned on a side of an end of a step image that faces a start point.

5. The display system according to claim 4, wherein the processor further configured to control the display to change a color of a portion positioned between the end of the step image and the image illustrating the delivery date.

6. The display system according to claim 4, wherein the display indicating that the delivery date will not be met is an icon.

7. The display system according to claim 4, wherein the display indicating that the delivery date will not be met is text expressing that the delivery date will not be met.

8. The display system according to claim 1, further comprising:
wherein the processor further configured to change a step image in a case where the another resource displayed by the display is selected.

9. The display system according to claim 8, wherein the processor further configured to change an entire length of the step image.

10. The display system according to claim 8, wherein the processor further configured to change a position of an end of the step image.

11. The display system according to claim 8, wherein the processor further configured to calculate a processing time in a case where the printed material generating step is executed using the another resource, and changes the step image on the basis of the processing time.

* * * * *